(12) United States Patent
Guenter et al.

(10) Patent No.: US 8,447,154 B2
(45) Date of Patent: May 21, 2013

(54) FIBER OPTIC CABLES AND ASSEMBLIES AND THE PERFORMANCE THEREOF

(75) Inventors: Cory Guenter, Conover, NC (US); James Register, III, Hickory, NC (US); Todd Rhyne, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 30 days.

(21) Appl. No.: 12/970,248

(22) Filed: Dec. 16, 2010

(65) Prior Publication Data

US 2011/0135259 A1 Jun. 9, 2011

Related U.S. Application Data

(63) Continuation of application No. PCT/US2009/003559, filed on Jun. 12, 2009.

(60) Provisional application No. 61/132,485, filed on Jun. 19, 2008.

(51) Int. Cl.
*G02B 6/44* (2006.01)

(52) U.S. Cl.
USPC .......................................... 385/103; 385/100

(58) Field of Classification Search ............ 385/100.103
See application file for complete search history.

(56) References Cited

U.S. PATENT DOCUMENTS

| 4,331,378 | A | * | 5/1982 | Hartig | 385/108 |
| RE32,436 | E | * | 6/1987 | Hartig | 385/108 |
| 4,836,642 | A | * | 6/1989 | Matsumoto et al. | 385/145 |
| 4,881,795 | A | * | 11/1989 | Cooper | 385/104 |
| 4,946,902 | A | * | 8/1990 | Bekiarian et al. | 525/326.2 |
| 5,076,659 | A | * | 12/1991 | Bekiarian et al. | 385/143 |
| 5,148,509 | A | * | 9/1992 | Kannabiran | 385/109 |
| 5,260,957 | A | | 11/1993 | Hakimi et al. | 372/39 |
| 5,558,669 | A | * | 9/1996 | Reynard | 606/15 |
| 5,561,729 | A | * | 10/1996 | Parris | 385/113 |
| 5,591,160 | A | * | 1/1997 | Reynard | 606/15 |
| 5,881,200 | A | | 3/1999 | Burt | 385/142 |
| 6,494,496 | B1 | * | 12/2002 | Sweeney | 285/115 |
| 6,577,801 | B2 | | 6/2003 | Broderick et al. | 385/125 |
| 6,654,531 | B2 | * | 11/2003 | Gruner-Nielsen et al. | 385/123 |
| 6,710,366 | B1 | | 3/2004 | Lee et al. | 257/14 |

(Continued)

FOREIGN PATENT DOCUMENTS

| AU | 2007334528 A1 | 12/2007 |
| EP | 0867740 A1 | 9/1998 |

(Continued)

OTHER PUBLICATIONS

Draka Comteq / Optical Fibre, "BendBright$^{xs}$ Single Mode Optical Fibre", product information sheet, Issue date: Aug. 2006.

(Continued)

*Primary Examiner* — Kaveh Kianni
(74) *Attorney, Agent, or Firm* — Russell S. Magaziner

(57) ABSTRACT

A fiber optic cable having optical fibers such as a microstructured bend performance optical fibers disposed within a protective covering. The protective covering is highly flexible and the fiber optic cable has extremely low delta attenuation when aggressively bent compared with the conventional fiber optic cable designs. Other variations of the present invention include a connector attached to the fiber optic cable.

10 Claims, 7 Drawing Sheets

U.S. PATENT DOCUMENTS

| | | | |
|---|---|---|---|
| 6,771,865 B2 * | 8/2004 | Blaszyk et al. | 385/127 |
| 6,801,699 B1 * | 10/2004 | Bickham et al. | 385/123 |
| 6,819,850 B2 * | 11/2004 | Sillard et al. | 385/127 |
| 6,839,484 B2 * | 1/2005 | White | 385/29 |
| 6,915,053 B2 * | 7/2005 | Hasegawa | 385/124 |
| 6,952,519 B2 * | 10/2005 | Bickham et al. | 385/127 |
| 6,968,107 B2 | 11/2005 | Belardi et al. | 385/127 |
| 7,043,125 B2 * | 5/2006 | Diep et al. | 385/123 |
| 7,046,884 B2 * | 5/2006 | Sasaoka et al. | 385/123 |
| 7,054,513 B2 | 5/2006 | Herz et al. | 385/12 |
| 7,082,243 B2 * | 7/2006 | Bickham et al. | 385/127 |
| 7,321,709 B2 * | 1/2008 | Yokokawa et al. | 385/103 |
| 7,391,954 B1 * | 6/2008 | Castonguay et al. | 385/140 |
| 7,397,991 B1 | 7/2008 | Register | 385/102 |
| 8,041,167 B2 * | 10/2011 | Overton | 385/109 |
| 8,081,853 B2 * | 12/2011 | Overton | 385/102 |
| 2003/0026566 A1 * | 2/2003 | Diep et al. | 385/123 |
| 2003/0103749 A1 * | 6/2003 | Kumar et al. | 385/127 |
| 2003/0128941 A1 | 7/2003 | Lanier et al. | 385/100 |
| 2004/0033039 A1 * | 2/2004 | Oliveti et al. | 385/123 |
| 2004/0253057 A1 * | 12/2004 | Tsuchiya et al. | 405/183.5 |
| 2005/0013566 A1 * | 1/2005 | Storaasli et al. | 385/113 |
| 2006/0039664 A1 * | 2/2006 | Bickham | 385/127 |
| 2006/0108790 A1 * | 5/2006 | Powell et al. | 285/45 |
| 2006/0133753 A1 * | 6/2006 | Nelson et al. | 385/125 |
| 2006/0257086 A1 | 11/2006 | Ohsono et al. | 385/123 |
| 2008/0013905 A1 | 1/2008 | Bookbinder et al. | 385/124 |
| 2008/0138022 A1 * | 6/2008 | Tassone | 385/124 |
| 2008/0145011 A1 | 6/2008 | Register | 385/128 |
| 2008/0298758 A1 * | 12/2008 | Johnson | 385/123 |
| 2009/0190890 A1 * | 7/2009 | Freeland et al. | 385/111 |
| 2010/0316340 A1 * | 12/2010 | Sales Casals et al. | 385/101 |

FOREIGN PATENT DOCUMENTS

| | | |
|---|---|---|
| EP | 1437612 | 7/2004 |
| EP | 1617243 A1 | 1/2006 |
| WO | WO2008/076252 A1 | 6/2008 |

OTHER PUBLICATIONS

Huntsman "IROGRAN A 78 P 4766", product information sheet, Update: Jul. 2001.

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15, 2000.

Pickrell et al., "Novel Techniques for the Fabrication of Holey Optical Fibers" Spie Conference Proceedings, vol. 4578, pp. 271-282; 2001.

The Lubrizol Corporation, Estane Thermoplastic Polyurethanes, Estane 58881 TPU Technical Data Sheet, Jul. 2006, 3 pgs.

Pickrell, et al., "Random Hole Optical Fibers," Proceedings of the SPIE, SPIE, Bellingham, VA, US, vol. 5272, XP002320309, Oct. 28, 2003, pp. 207-215.

Ellis, et al., "Microstructural Analysis of Random Hole Optical Fibers," IEEE Photonics Technology Letters, IEEE Service Center, Piscataway, NJ, US, vol. 16, No. 2, XP011107303, Feb. 2004, pp. 491-493.

Patent Coorperation Treaty, International Search Report for International Application No. PCT/US2007/025308, May 20, 2008, 2 pages.

Australian Patent Office Examiner's First Report, Application No. 2009260839, dated Oct. 7, 2011, 2 pages.

Filed Response to Australian Patent Office Examiner's First Report, Application No. 2009260839, dated Sep. 27, 2012, 13 pages.

Australian Patent Office Examiner's Second Report, Application No. 2009260839, dated Oct. 9, 2012, 3 pages.

* cited by examiner

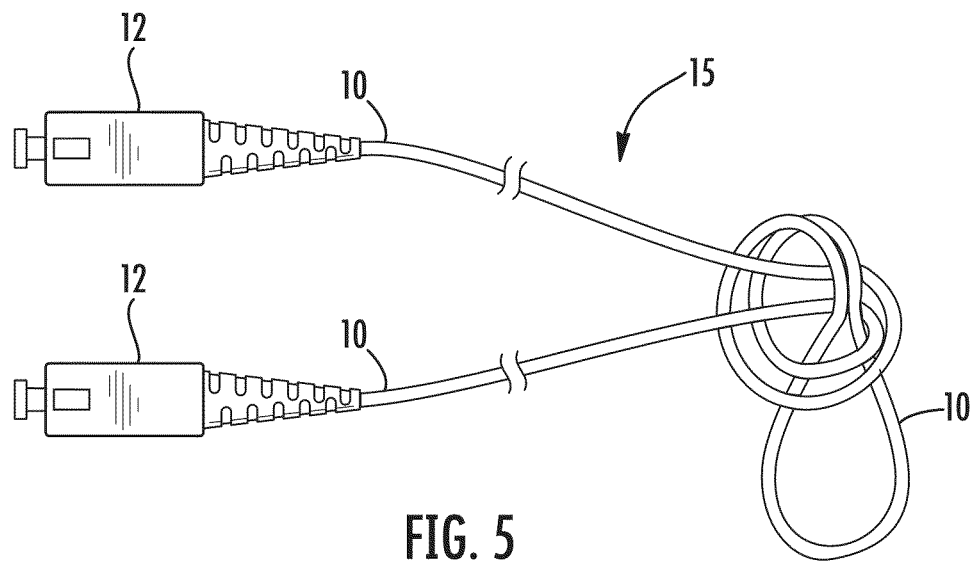
FIG. 5
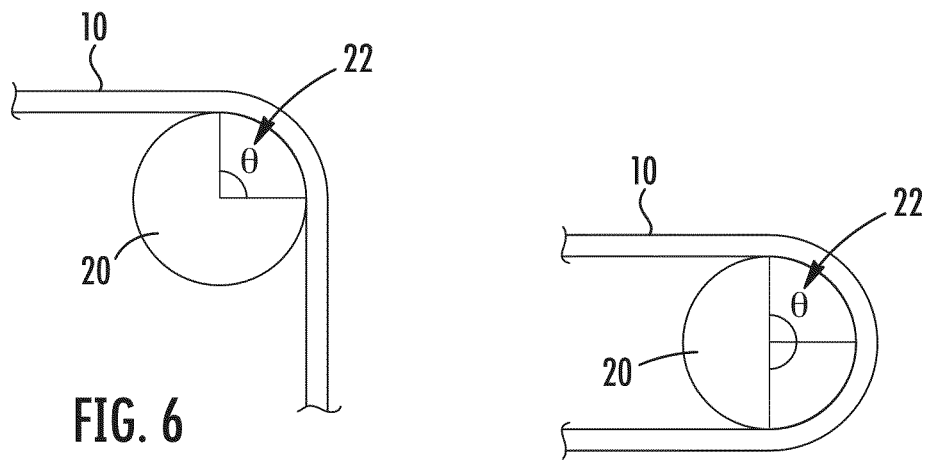
FIG. 6
FIG. 7

US 8,447,154 B2

FIBER OPTIC CABLES AND ASSEMBLIES AND THE PERFORMANCE THEREOF

CROSS-REFERENCE TO RELATED APPLICATIONS

This application is a Continuation of International Application No. PCT/US2009/003559 filed on Jun. 12, 2009, which claims priority to U.S. Provisional Application No. 61/132,485, filed on Jun. 19, 2008, both applications being incorporated herein by reference.

This application is also related to U.S. patent application Ser. No. 11/638,627, filed on Dec. 13, 2006, now U.S. Pat. No. 7,397,991, and U.S. patent application Ser. No. 12/156,162, filed on May 30, 2008.

TECHNICAL FIELD

The present disclosure relates generally to fiber optic cables and jumper assemblies and the performance thereof. By way of example, the disclosure is related to assemblies such as optical fiber jumpers having bend performance optical fibers.

BACKGROUND

Along with the increase in the deployment of "Fiber-to-the-Premises" (FTTP) optical networks, a need has arisen for increasing the performance, manageability, handleability and flexibility of fiber optic cables, cable assemblies and network components. With respect to outdoor installation environments, cables, cable assemblies and other network components are being developed that are more easily interconnected and installed within their environment, such as aerial installations and small diameter conduit. With respect to indoor environments and multi-dwelling units, cables and other network components are being developed to improve installation aesthetics and to interconnect an increasing number of subscribers. Within both environments, it would be desirable to develop components that perform better, are more flexible, robust and long lasting.

Conventional cables, cable assemblies, jumpers, and other network components typically define structure that accommodates, and is in part, limited by the physical characteristics of the optical fibers contained therein. In other words, it is often the case that the physical and performance limitations of the optical fibers partly define assembly structure and processes associated with manufacturing the assemblies. Thus, optical fibers are one limiting factor in the evolution of fiber optic networks.

SUMMARY

In accordance with the purposes of the invention as embodied and broadly described herein, the present embodiments are addressed to fiber optic cables, jumpers and other assemblies including bend performance optical fibers in at least a portion thereof. The bend performance optical fibers have physical and performance characteristics that allow for reduced component size, tighter bend radius tolerances without degraded performance, which relaxes fiber routing and handling requirements.

In one embodiment, the bend performance optical fibers are microstructured optical fibers comprising a core region and a cladding region surrounding the core region, the cladding region comprising an annular hole-containing region comprised of non-periodically disposed holes or voids, such that the optical fiber is capable of single mode transmission at one or more wavelengths in one or more operating wavelength ranges. The non-periodically disposed holes are randomly or non-periodically distributed across a portion of the fiber. The holes may be stretched (elongated) along the length (i.e. in a direction generally parallel to the longitudinal axis) of the optical fiber, but may not extend the entire length of the entire fiber for typical lengths of transmission fiber.

In other embodiments, the bend performance fibers of the present embodiments may comprise at least a portion of fiber optic cables, fiber optic cable assemblies, network connection terminals, fiber optic hardware or any other fiber optic network component including at least one optical fiber maintained therein, routed therein or routed therethrough.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

FIG. 5 illustrates the optical fiber jumper assembly of FIG. 3 tied in a knot.

FIG. 6 illustrates a portion of an optical fiber jumper assembly including bend performance fiber bent about 90 degrees around generic network structure.

FIG. 7 illustrates a portion of an optical fiber jumper assembly including bend performance optical fiber bent about 180 degrees around generic network structure.

DETAILED DESCRIPTION

Figure 1:
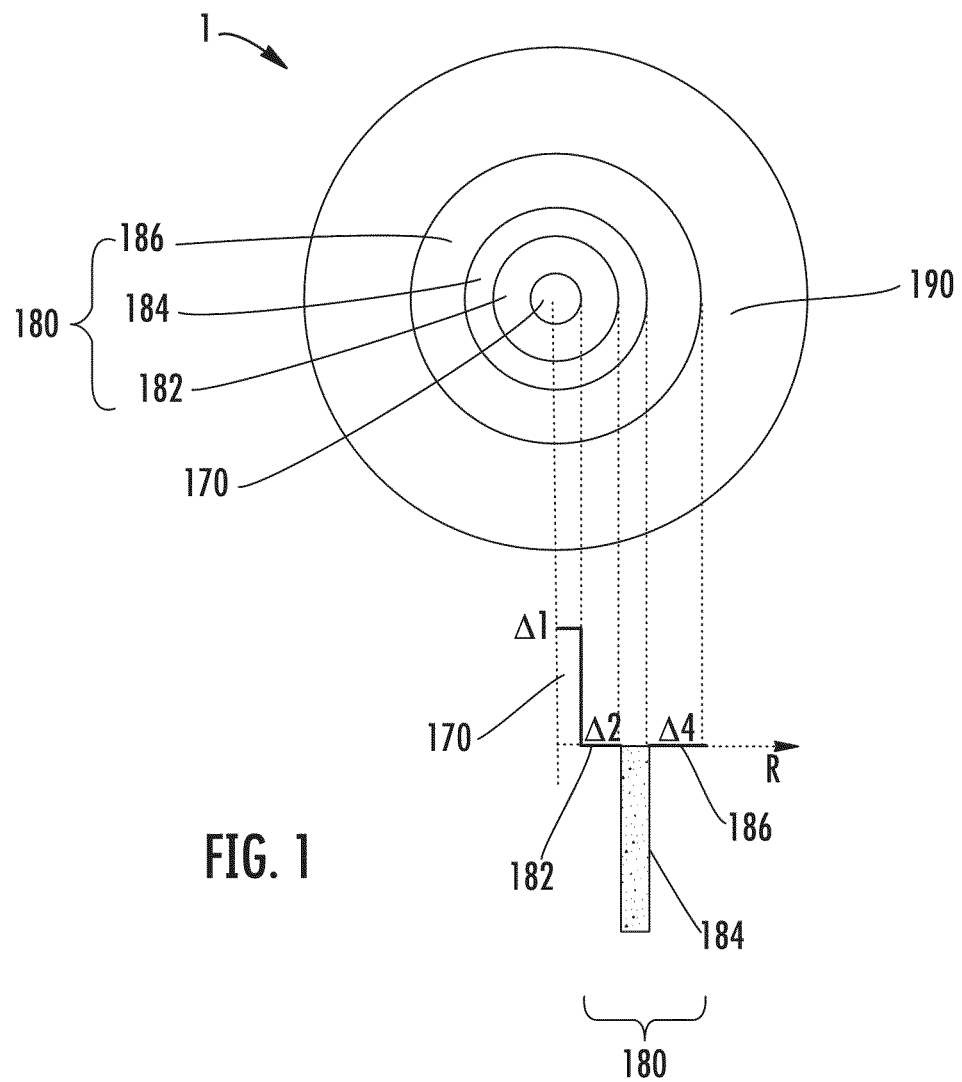
FIG. 1 is a schematic diagram illustrating a cross-section of a bend performance optical fiber in accordance with an exemplary embodiment.

FIG. 1 depicts a bend performance optical fiber 1 suitable for use in fiber optic cables, cables assemblies, fiber optic hardware and other network components of the present invention. The present embodiments allow assemblies having aggressive bending/installation solutions while maintaining extremely low optical attenuation. The bend performance optical fiber 1 is a microstructured optical fiber having a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than about 1310 nm, in other embodiments also greater than 1260 nm. The optical fibers provide a mode field at a wavelength of 1310 nm preferably greater than 8.0 microns, more preferably between about 8.0 and 10.0 microns.

In some embodiments, the microstructured optical fibers disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than about 30 percent, and the non-periodically disposed holes have a mean diameter of less than 1550 nm.

"Non-periodically disposed" or "non-periodic distribution" means that when one takes a cross-section (such as a cross-section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. The holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than about 95% of and preferably all of the holes exhibit a mean hole size in the cladding for the optical fiber which is less than 1550 nm, more preferably less than 775 nm, most preferably less than 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fibers disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

In one set of embodiments, the core region includes doped silica to provide a positive refractive index relative to pure silica, e.g. germania doped silica. The core region is preferably hole-free. As illustrated in FIG. 1, in some embodiments, the core region 170 comprises a single core segment having a positive maximum refractive index relative to pure silica $\Delta_1$ in %, and the single core segment extends from the centerline to a radius $R_1$. In one set of embodiments, 0.30%<$\Delta_1$<0.40%, and 3.0 μm<$R_1$<5.0 μm. In some embodiments, the single core segment has a refractive index profile with an alpha shape, where alpha is 6 or more, and in some embodiments, alpha is 8 or more. In some embodiments, the inner annular hole-free region 182 extends from the core region to a radius $R_2$, wherein the inner annular hole-free region has a radial width W12, equal to R2−R1, and W12 is greater than 1 μm. Radius R2 is preferably greater than 5 μm, more preferably greater than 6 μm. The intermediate annular hole-containing region 184 extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings 190 may be applied to the external surface of the silica portion of the optical fiber, starting at R4, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has an inner radius R2 which is not more than 20 μm. In some embodiments, R2 is not less than 10 μm and not greater than 20 μm. In other embodiments, R2 is not less than 10 μm and not greater than 18 μm. In other embodiments, R2 is not less than 10 μm and not greater than 14 μm. Again, while not being limited to any particular width, the hole-containing region 184 has a radial width W23 which is not less than 0.5 μm. In some embodiments, W23 is not less than 0.5 μm and not greater than 20 μm. In other embodiments, W23 is not less than 2 μm and not greater than 12 μm. In other embodiments, W23 is not less than 2 μm and not greater than 10 μm.

Such fiber can be made to exhibit a fiber cutoff of less than 1400 nm, more preferably less than 1310 nm, a 20 mm macrobend-induced loss at 1550 nm of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, a 12 mm macrobend-induced loss at 1550 nm of less than 5 dB/turn, preferably less than 1 dB/turn, more preferably less than 0.5 dB/turn, even more preferably less than 0.2 dB/turn, still more preferably less than 0.01 dB/turn, still even more preferably less than 0.05 dB/turn, and an 8 mm macrobend-induced loss at 1550 nm of less than 5 dB/turn, preferably less than 1 dB/turn, more preferably less than 0.5 dB/turn, and even more preferably less than 0.2 dB-turn, and still even more preferably less than 0.1 dB/turn.

Figure 2:
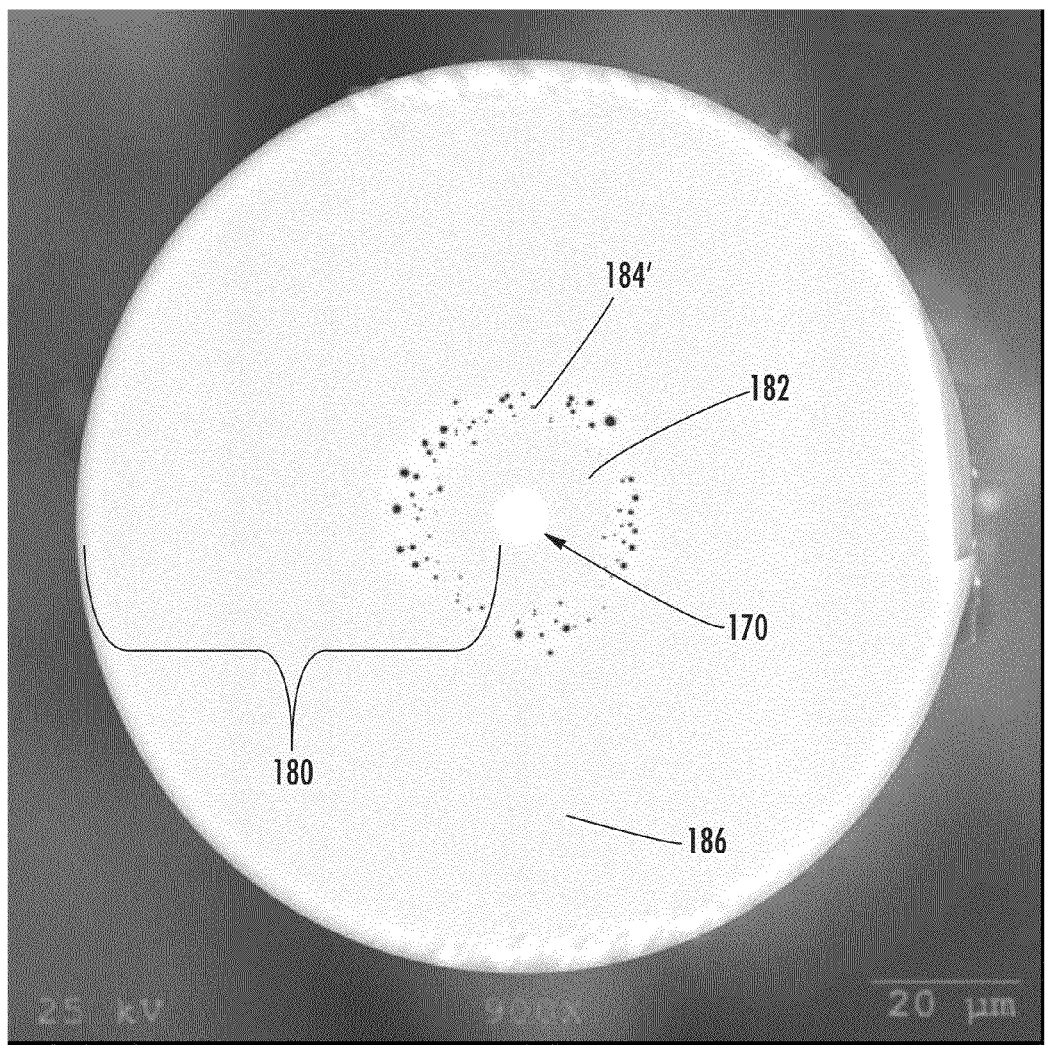
FIG. 2 is a cross-section of a bend performance optical fiber having an annular hole-containing region comprised of non-periodically disposed holes.

An example of a suitable fiber is illustrated in FIG. 2. The fiber in FIG. 2 comprises a core region that is surrounded by a cladding region that comprises randomly disposed voids which are contained within an annular region spaced from the core and positioned to be effective to guide light along the core region. Other optical fibers and microstructured fibers may be used in the present invention. Additional description of microstructured fibers used in the present invention are disclosed in U.S. application Ser. No. 11/583,098, filed Oct. 18, 2006, now U.S. Pat. No. 7,450,806; Provisional U.S. App. No. 60/817,863, filed Jun. 30, 2006; U.S. application Ser. No. 11/823,681, filed Jun. 28, 2007; U.S. Provisional App. No. 60/817,721, filed Jun. 30, 2006; U.S. Provisional App. No. 60/841,458, filed Aug. 31, 2006; U.S. Provisional App. No. 61/063,986, filed Feb. 7, 2008; and U.S. Provisional App. No. 61/126,608, entitled "MICROSTRUCTURED TRANSMISSION OPTICAL FIBER", filed May 6, 2008, all of which are assigned to Corning Incorporated and are hereby incorporated herein by reference.

Figure 2A:
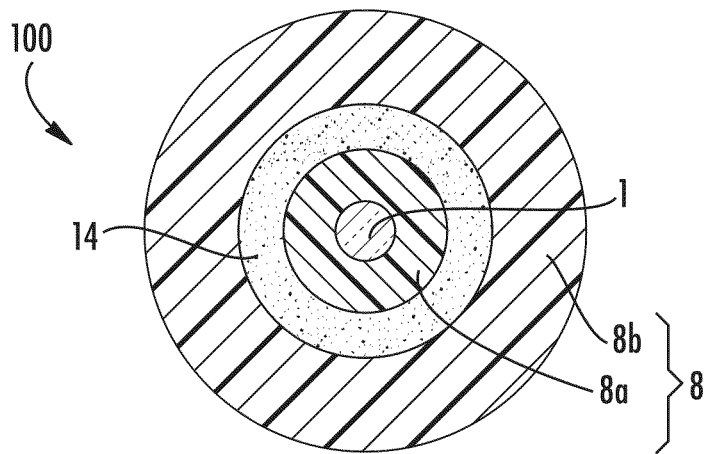
FIG. 2a is a cross-section of a fiber optic cable incorporating the bend performance optical fiber of FIG. 1.
Figure 2B:
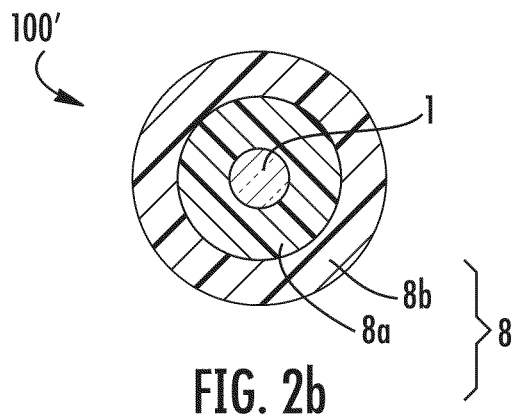
FIG. 2b is a cross-section of another fiber optic cable incorporating the bend performance optical fiber of FIG. 1.

Optical fiber cables of the present invention allow aggressive bending such as for installation, slack storage, and the like while inhibiting bend radii that allow damage and/or breaks the optical fiber. FIG. 2a shows a cross-sectional view of explanatory fiber optic cable 100 having optical fiber 1 within a protective covering 8. Generally speaking, the optical fiber 1 is maintained within at least one protective covering such as a buffer layer and/or a jacket and is referred to herein as a "fiber optic cable". The protective covering 8 includes a buffer layer 8a disposed about the optical fiber 1 and a jacket 8b. Additionally, the fiber optic cable 100 also includes a plurality of optional strength members 14 disposed between the buffer layer 8a and the jacket 8b. The strength members 14 can also include a water-swellable component for blocking the migration of water along the fiber optic cable. FIG. 2b depicts an alternate fiber optic cable 100' that is similar to the fiber optic cable 100, but it does not include strength members and consequently has a smaller outer diameter such as about 4 millimeters if the jacket wall thickness remains the same. Additionally, since the strength members are omitted it is possible to remove the buffer layer and jacket from the fiber optic cable in a single step. Other fiber optic cables and/or other assembly designs are also possible according to the concepts of the invention. By way of example, variations of the fiber optic cables 100 and 100' can be preconnectorized with a connector for plug and play connectivity. For instance, fiber optic cables can include a hardened plug and connector such as an Opti-Tap™ or Opti-Tip™ available from Corning Cable Systems of Hickory, N.C.

The protective covering 8 uses a bend radius control mechanism for protecting the optical fiber 1 by inhibiting damage and/or breaking of the optical fiber as the fiber optic cable is bent into small bend radii while still providing a highly flexible fiber optic cable design. In other words, the bend radius control mechanism maintains a minimum bend radius for the optical fiber 1 to avoid damage to and/or breakage of the fiber. By way of example, the fiber optic cable 100 can be tied in a knot, bent about small structures, and the like while having extremely low optical attenuation; however, the fiber optic cable still should prevent damage and/or breaking of the optical fiber during these installations. Previously, conventional fiber optic cables would have high optical attenuation or go dark before breaking the optical fiber was a concern, thus the craft avoided using small bend radii for preserving optical performance. One benefit of the present embodiments is that the fiber optic cable designs are suitable for rugged installations both by the craft and untrained individuals.

Robustness of the fiber optic cable design is accomplished by suitable coupling with the protective covering 8 for inhibiting buckling of the optical fiber 1. Additionally, maintaining coupling between the jacket 8b and the strength members 14 inhibits the transfer of tensile forces to the optical fiber 1. Coupling is accomplished using a pressure extrusion process and can allow aggressive bending of the fiber optic cable while maintaining a suitable coupling level. Consequently, the coupling results in very little to no construction stretch for the strength members. As used herein, construction stretch means that all of the cable components are not simultaneously stretched when applying a tensile force to the fiber optic cable. Illustratively, a fiber optic cable exhibiting construction stretch typically has the jacket and optical fiber supporting the initially applied tensile force, but the strength members do not. Thus, as the jacket and optical fiber are stretched to a point where the slack in the strength members is removed, the strength members also begin to support the part of the load. Construction stretch is problematic since it imposes initial strain on the fiber, which limits the ultimate tensile strength of the fiber optic cable. Additionally, after the tensile force is removed from the fiber optic cable, the jacket stretched before the optical fiber, thereby allowing buckling and/or compression of the optical fiber within the fiber optic cable that can cause optical losses. Any suitable type of material may be used for protective covering 8 such as polyurethanes (PU), polyvinylchloride (PVC), polyethylenes (PE), polyproplyenes (PP), UV-curable materials, etc. depending on the desired construction and characteristics. Additionally, protective coverings 8 can use flame-retardant materials such as a flame-retardant PVC or the like as known in the art. Desirably, fiber optic cables of the invention uses highly-flexible and robust designs that allow aggressive bending of the cable while maintaining minimum bend radii.

Figure 2C:
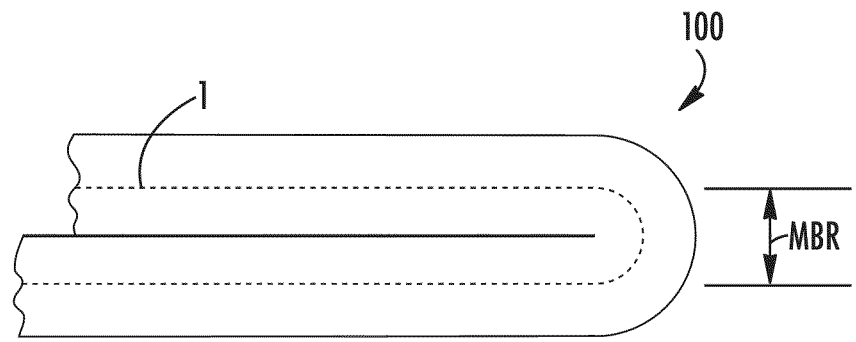
FIG. 2c is a plan view of the fiber optic cable of FIG. 2a being bent in an aggressive manner to demonstrate a minimum bend radius.

More specifically, fiber optic cable 100 is designed so that it is highly flexible, maintains a minimum bend radius to inhibit breaking of the optical fiber when aggressively bent, and have enough coupling between the protective covering 8 and the optical fiber 1 to inhibit buckling of the fiber within the protective covering 8. By way of example, the fiber optic cable 100 includes an optical fiber 1 having a plenum-grade buffer layer 8a with an outer diameter of about 900 microns. Other types of materials, sizes, shapes, etc are also possible for the buffer layer. Thereafter, four strength members 14 were run in a parallel configuration (i.e., no stranding) about the buffered optical fiber before application of the jacket 8b. Eliminating stranding of the strength members 14 is also advantageous since it allows for increased line speeds. The outer jacket 8b was pressure extruded using a PU material available from Huntsman available under the trade name IROGRAN A78 P 4766. The jacket material had a relatively high ultimate elongation (i.e., elongation before breaking) measured according to DIN 53504 (a German measurement standard), thereby providing a highly flexible fiber optic cable design. Jackets for fiber optic cables of the invention have an ultimate elongation that is about 500% or greater such as about 600% or greater, and even about 700% or greater. The PU jacket material used had an ultimate elongation of about 800% along with a 300% tensile modulus of about 8.0 MPa. Additionally, the jacket 8b had an outer diameter of about 5 millimeters with an inner diameter of about 1.7 millimeters. Consequently, the fiber optic cable 100 had excellent flexibility while still inhibiting breaking of the optical fiber 1 when aggressively bent, such as when a fiber optic cable is bent like a hairpin as shown in FIG. 2c. In this case, the bend radius control mechanism MBR is provided by jacket 8b in addition to its coupling characteristics. In other words, the bend radius control mechanism MBR of jacket 8b provides a minimum bend diameter of about 5 millimeters (e.g., about two times the radius of the fiber optic cable) for inhibiting breaking of the optical fiber 1 when bent as shown in FIG. 2c. Using the bend radius control mechanism also improves crush performance of the fiber optic cable since the jacket 8 is relatively thick and highly flexible. Furthermore, the optical performance of fiber optic cable 100 during aggressive bending is impressive compared with conventional fiber optic cables.

To test the optical performance of fiber optic cable 100, a corner bend test was conducted as described below. The corner bend test routed a portion of fiber optic cable 100 over a 90 degree edge (i.e., nearly a zero bend radius) and weights were hung from the fiber optic cable to apply a constant force at the bend while measuring a delta attenuation (i.e., the change or increase in attenuation) due to the applied force, at a reference wavelength of 1625 nanometers. The corner bend test used the fiber optic cable 100 and a similar fiber optic cable design using a SMF28-e optical fiber available from Corning, Inc. The results for the corner bend test are summarized in Table 1 below.

TABLE 1

Corner Bend Test

| Load (kg) | Conventional Cable Delta Attenuation (dB) | | | Fiber Optic Cable 100 Delta Attenuation (dB) | | |
|---|---|---|---|---|---|---|
| | 1310 nm | 1550 nm | 1625 nm | 1310 nm | 1550 nm | 1625 nm |
| 0 | 0.00 | 0.00 | 0.00 | 0.00 | 0.01 | 0.02 |
| 0.6 | 1.16 | 3.16 | 5.21 | 0.01 | 0.02 | 0.04 |
| 1 | 2.51 | 8.14 | 11.06 | 0.01 | 0.06 | 0.09 |
| 5 | — | — | — | 0.03 | 0.18 | 0.22 |
| 10 | — | — | — | 0.03 | 0.15 | 0.22 |

FIG. 7 illustrates a portion of an optical fiber jumper assembly including bend performance fiber bent about 180 degrees around generic network structure.

As depicted in Table 1, the conventional cable had elevated levels of delta attenuation at all wavelengths under a load of 0.6 kilograms. Moreover, the delta attenuation in the conventional cable was so high when subjected to loads over 1 kilogram that measurements were not taken. In contrast, the fiber optic cable 100 had low delta attenuation values under loads up to 10 kilograms. By way of example, the fiber optic cable 100 had a delta attenuation of about 0.1 dB or less for the corner bend test under a load of 1 kilogram at a reference wavelength of 1625 nanometers.

Mandrel Wrap testing was performed in which a conventional cable and the fiber optic cable 100 were wrapped varying numbers of turns about mandrels of differing diameters. A delta attenuation (dB) was measured for each cable at for each diameter and number of turns.

TABLE 2

Mandrel Wrap Test at a Reference Wavelength of 1625 nm

| Number of Turns | Conventional Cable Delta Attenuation (dB) | | | Fiber Optic Cable 100 Delta Attenuation (dB) | | |
|---|---|---|---|---|---|---|
| | 4.6 mm mandrel | 7.5 mm mandrel | 15 mm mandrel | 4.6 mm mandrel | 7.5 mm mandrel | 15 mm mandrel |
| 0 | — | — | 0.00 | 0.00 | 0.00 | 0.00 |
| 1 | — | — | 3.10 | 0.39 | 0.10 | 0.07 |
| 2 | — | — | 7.96 | 0.56 | 0.18 | 0.11 |
| 3 | — | — | 11.58 | 0.83 | 0.33 | 0.17 |
| 4 | — | — | 16.03 | 1.18 | 0.53 | 0.23 |
| 5 | — | — | 20.19 | 1.43 | 0.68 | 0.23 |

As depicted in Table 2, the conventional cable had elevated levels of delta attenuation when wrapped about a 15 millimeter diameter mandrel. Moreover, the delta attenuation was so large with mandrels smaller than 15 millimeters in diameter that the measurements were not taken. On the other hand, the fiber optic cable 100 had delta attenuation values that were more than an order of magnitude lower using a 15 millimeter diameter mandrel. By way of example, fiber optic cable 100 had a delta attenuation of about 0.33 dB or less when wrapped 3 turns about a 7.5 millimeter diameter mandrel at a reference wavelength of 1625 nanometers.

Figure 3:
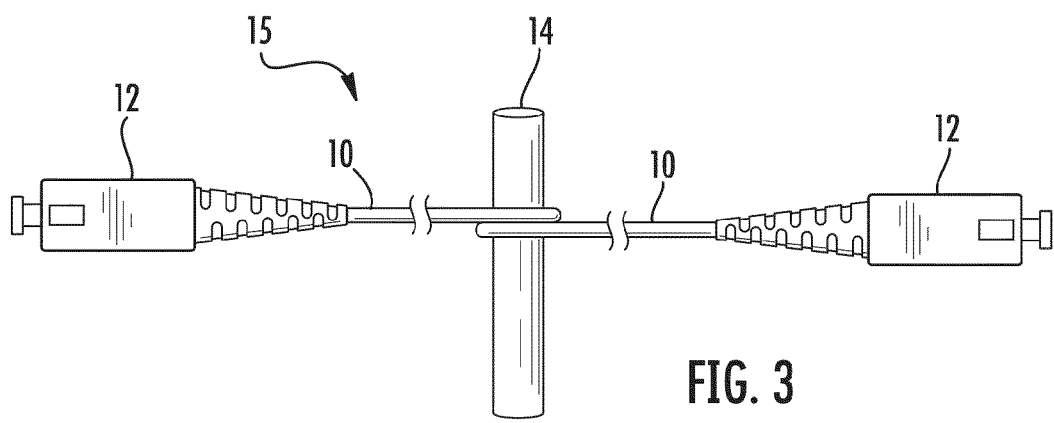
FIG. 3 illustrates one embodiment of an optical fiber jumper assembly incorporating the bend performance optical fiber of FIG. 1 undergoing about one turn about a small diameter structure.
Figure 4:
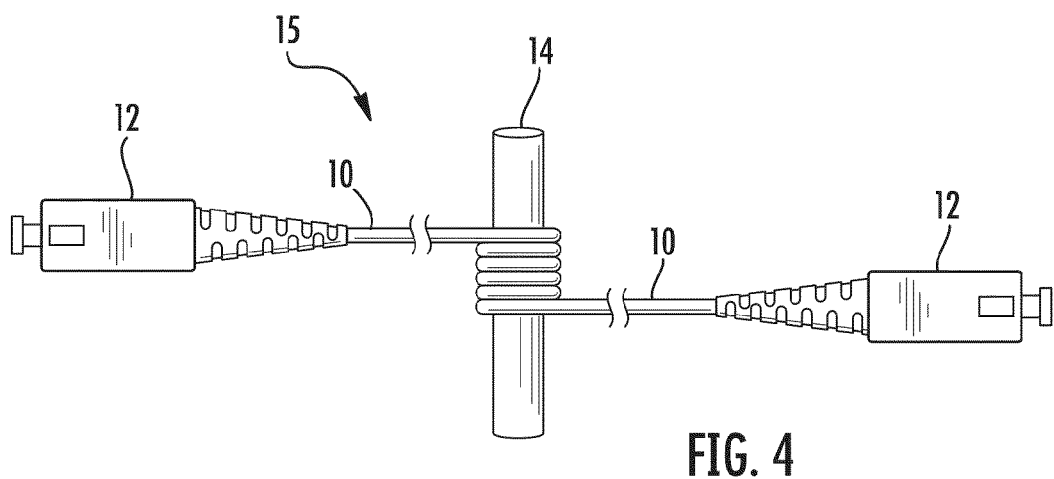
FIG. 4 illustrates the optical fiber jumper assembly of FIG. 3 undergoing multiple turns about a structure.

Another example of assemblies useful with the concepts of the present invention are optical fiber jumper assemblies that are, generally speaking, used within structures for interconnection purposes. FIGS. 3-5 depict an explanatory optical fiber jumper assembly 15 (hereinafter "jumper assembly") using optical fiber 1 and is shown in various configurations to illustrate physical and performance capabilities of assemblies according to the concepts of the invention. Moreover, jumper assemblies represented by jumper assembly 15 were tested for optical performance and compared with conventional jumper assemblies as presented below. Jumper assemblies of the invention preserve optical attenuation during, for example, macrobending down to levels not previously attainable with previous constructions.

As shown, the jumper assembly 15 is connectorized at each end using SC connectors 12, such as those available from Corning Cable Systems of Hickory, N.C., using techniques known in the art. Of course, jumper assemblies may include any length of fiber optic cable, type of connector and/or number of optical fibers capable of performing interconnections within an optical network. It is envisioned that a jumper assembly may be connectorized at each end using similar or dissimilar connector types such as LC, FC, MT, MTP, among others. The jumper assembly 15 may be aggressively bent, either stand-alone or about network structure, such as for installation, slack storage and routing without suffering appreciable attenuation and without damage and/or breaks to the optical fiber. The at least one optical fiber 1 is within a protective covering 10 such as, but not limited to, a coating, a buffer, or a jacket. In one example, the fiber 1 may be upjacketed to about 500 um or about 900 um. The jumper assembly may further include strength members, such as aramid strength members, as is commonly known in the art. Other fiber optic jumper assemblies are also possible according to the concepts of the invention.

The protective covering 10 may be made from material including bend radius control properties for protecting the at least one optical fiber within by inhibiting damage and/or breaking of the optical fiber as the jumper assembly is bent into small bend radii while still providing a highly flexible jumper design. By way of example, the jumper assembly 15 can be tied in a knot, bent about small structures, and the like while having extremely low optical attenuation.

Referring specifically to FIG. 3, the jumper assembly 15 is shown completing one turn or wrap about a mandrel 14. The mandrel 14 is shown to provide a guide for bending the jumper assembly 15 about a structure, and generically the mandrel 14 may represent a portion of network structure about which the jumper assembly 15 is installed (e.g., a network interface device (NID), a cabinet, routing guide, connector housing, connector port or the like). The mandrel 14 defines a diameter, for example, the diameter is about 10 millimeters or about 6 millimeters, but other sizes are possible. Referring specifically to FIG. 4, the jumper assembly 15 is shown wrapped about the mandrel 14 and completing about five turns. Referring specifically to FIG. 5, the jumper assembly 15 is shown tied in a knot.

Table 3 details optical performance attenuation loss data for different fiber optic cable designs at a reference wavelength of 1625 nanometers. The delta attenuation (dB) for the loss was measured after wrapping a predetermined number of turns (i.e., each turn is about 360 degrees) of fiber optic cable around two mandrels of different diameter (6 mm and 10 mm). The cables were also subjected to corner bend testing. Table 3 depicts the results for two different single fiber cable (SFC) designs (i.e., a 2.0 millimeter SFC and a 2.9 millimeter SFC) that were used as a portion of the tested jumper assemblies. Each of the SFC designs used a conventional optical fiber and a microstructured bend performance optical fiber, thereby resulting in four jumper assemblies for testing. Additionally, two different microstructured bend performance optical fibers were used in the jumper assemblies of the present invention to compare performance, listed in the table below as Type I and Type II bend performance fibers. The conventional optical fiber used in the conventional jumper assemblies was a SMF-28e optical fiber available from Corning Incorporated of Corning, N.Y. Both the 2.0 millimeter and the 2.9 SFC designs included an optical fiber having a 900 micron buffer layer thereon that was surrounded by a plurality of aramid strength members and a jacket. The differences between the 2.0 millimeter and 2.9 millimeter SFC include the jacket wall thickness (e.g., respectively about 0.33 millimeters and about 0.45 millimeters) and the quantity of aramid used.

TABLE 3

Delta Attenuation (dB) at 1625 nm after Wrapping Around a Mandrel

| Mandrel Diameter - # of Turns | Delta Attenuation Conventional 2.0 mm SFC | Delta Attenuation Conventional 2.9 mm SFC | Delta Attenuation 2.0 mm SFC Type I | Delta Attenuation 2.9 mm SFC Type II |
|---|---|---|---|---|
| 10 mm - 1 Turns | 25.42 dB | 27.20 dB | 0.11 dB | 0.00 dB |
| 10 mm - 2 Turns | 41.30 dB | 42.30 dB | 0.27 dB | 0.00 dB |
| 10 mm - 3 Turns | 45.00 dB | 45.00 dB | 0.42 dB | 0.00 dB |
| 10 mm - 4 Turns | 45.89 dB | 45.80 dB | 0.70 dB | 0.00 dB |
| 10 mm - 5 Turns | 46.20 dB | 46.20 dB | 0.93 dB | 0.00 dB |
| 6 mm - 1 Turns | 46.20 dB | 46.00 dB | 0.46 dB | 0.00 dB |
| 6 mm - 2 Turns | 46.20 dB | 46.00 dB | 0.98 dB | 0.00 dB |
| 6 mm - 3 Turns | 46.20 dB | 46.00 dB | 1.70 dB | 0.00 dB |
| 6 mm - 4 Turns | 46.20 dB | 46.00 dB | 2.72 dB | 0.00 dB |
| 6 mm - 5 Turns | 46.20 dB | 46.00 dB | 3.12 dB | 0.00 dB |
| 90 degree bend | 0.86 dB | 0.53 dB | 0.03 dB | 0.00 dB |

As depicted in Table 3, the conventional SFC jumpers had elevated levels of delta attenuation at all numbers of turns about the 10 mm and 6 mm diameter mandrels. In comparison, the jumper assemblies including both Type I and II fiber had delta attenuation orders of magnitude lower, and with respect to the jumper assembly including Type II bend performance fiber, there was no measurable delta attenuation for any of the tested number of turns or mandrel diameter. Both the conventional and Type I and II jumper assemblies were also bent about a 90 degree bend, as in a corner bend test, and the jumper assemblies including bend performance fiber outperformed the conventional jumpers. By way of example, the jumper assembly 15 including bend performance fiber had a delta attenuation of about 0.03 dB or less for the 90 degree bend test at a reference wavelength of 1625 nanometers.

Bend performance fibers of the present invention may be included within various cable types and cable assemblies to achieve highly flexible cables to facilitate installation and require less skill in handling. The cables and cable assemblies described herein may be installed within fiber optic hardware such as local convergence points for multi-dwelling units, cross-connect frames and modules, and surface, pad and pole mounted local convergence points showing smaller size and higher density. Referring to FIGS. 6-7, a portion of the jumper assembly with the protective covering 10 is shown wrapped around generic network structure 20. An angle theta 22 corresponds to a portion of a turn about the generic structure 20. Generic structure 20 may include, but is not limited to, structure of fiber optic cable assemblies, hardware, spools, thru holes, connector ports, routing guides, cabinets or any other structure within the network.

Example

According to one exemplary embodiment, a fiber optic cable as illustrated in FIG. 2a is a rugged drop cable with a riser rated PVC outer jacket 8b. The outer jacket 8b can be made from PVC material available from Georgia Gulf Corporation under the product designation GEORGIA GULF 16881 COAX AND TELECOM FLEXIBLE PVC, and may have a jacket elongation of at least 270%. The jacket elongation may fall in the range of 300-350% according to one application. The maximum brittleness temperature may be −28° C. The relatively low brittle point temperature may help the cable conform with industry standard cold impact tests as well as affording greater flexibility for ease of installation in low temperature environments. The strength members 14 are made from an aramid yarn. The buffer layer 8a may be a tight buffer layer made from a PVC material. The outer diameter of the jacket 8b is 900 μm and the outer diameter of the buffer layer 8a is 4.8 mm.

Example

According to another exemplary embodiment, a fiber optic cable as illustrated in FIG. 2a is a rugged, indoor/outdoor drop cable having a UV-resistant, fungus-resistant, riser rated PVC outer jacket 8b. The outer jacket 8b can be made from PVC material available from Georgia Gulf Corporation under the product designation GEORGIA GULF 16882 COAX AND TELECOM FLEXIBLE PVC, and may have a jacket elongation of at least 270%. The jacket elongation may fall in the range of 300-350% according to one application. The outer jacket 8b includes additives to increase its UV light resistance and fungus resistance. The maximum brittleness temperature is −35° C. The relatively low brittle point temperature may help the cable conform with industry standard cold impact tests as well as affording greater flexibility for ease of installation in low temperature environments. The outer diameter of the jacket 8*b* is 900 µm and the outer diameter of the buffer layer 8*a* is 4.8 mm.

Figure 8:
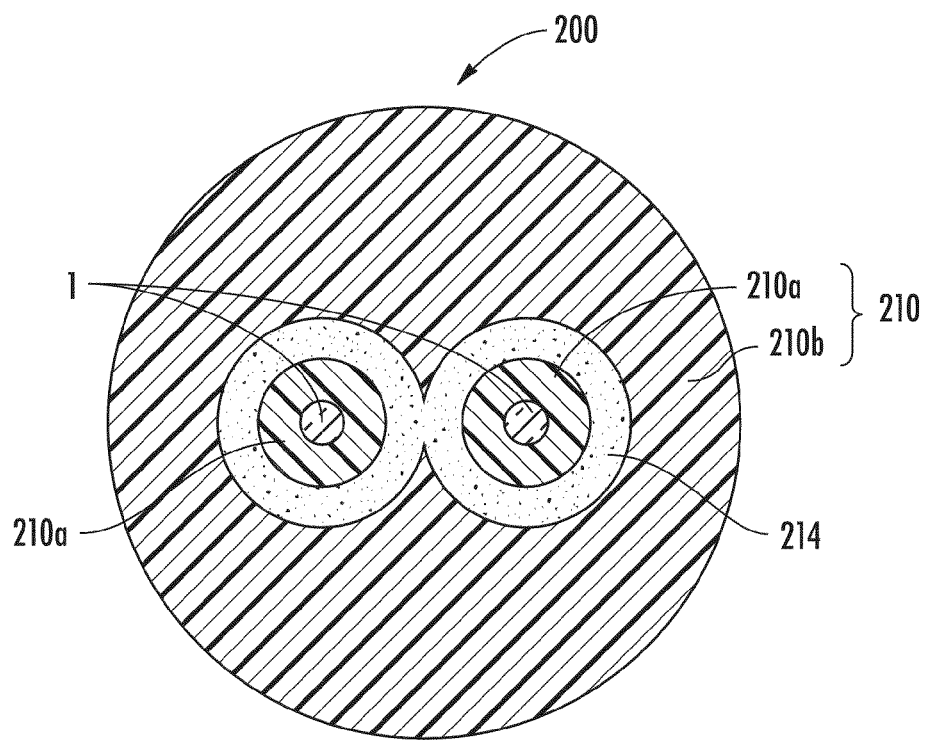
FIG. 8 is a cross-sectional view of another fiber optic cable including the bend performance optical fiber of FIG. 1.

FIG. 8 depicts a cross-sectional view of a multi-fiber fiber optic cable 200 according to an embodiment of the present invention. In the illustrated embodiment, the cable 200 includes two optical fibers 1. The optical fibers 1 are maintained within a protective covering 210 comprising spaced buffer layers 210*a* and an outer jacket 210*b*. The cable 200 may also include a plurality of longitudinally-extending strength members 214 disposed between the buffer layers 210*a* and the outer jacket 210*b*. The buffer layers 210*a* are separated by an intervening space in which the strength members 214 can be disposed. A portion of the jacket 210*a* can also extend inwardly so that it is disposed between the buffer layers 210*a*.

In the embodiments described in this specification, an arrangement of strength members can include, for example, a plurality of aramid yarn strands that extend along a length of a cable. In FIG. 8, the buffer layers 210*a* are illustrated as separated by a space, with strength members 214 disposed in the intervening space. The two buffer layers 210*a* may, however, contact one another at one or more locations along the length of the cable 200. The strength members 214 can include, for example, a water-swellable component for blocking the migration of water along the fiber optic cable 200. The water-swellable component can be, for example, a superabsorbent polymer embedded in the aramid yarn of the strength members 214. As discussed above, the outer jacket 210*b* can be pressure extruded over the strength members 214 so that the outer jacket 210*b* becomes coupled with outer strength members surrounding the buffer layers 210*a* of the buffered fibers 1. The outer jacket 210*b* becomes coupled to the yarn strength members 214 due to friction caused by partial embedding of the strength members 214 into the outer jacket 210*b* during extrusion. In the embodiment illustrated in FIG. 8, the number of strands of aramid yarn is in the range of 4-16 yarns. According to one embodiment, the strength members 214 number 8 yarns.

In one embodiment, the outer jacket 210*b* comprises a riser rated PVC material having a maximum brittleness temperature of −28° for cold impact performance, the strength members 214 are made from aramid fiber, and the buffer layers 210*a* are PVC tight buffer coatings. The cable 200 can, for example, be incorporated into an optical fiber jumper assembly as shown in FIGS. 3-5.

Corner bend tests were conducted to test the optical performance of the fiber optic cable 200 shown in FIG. 8. The corner bend tests routed a portion of the fiber optic cable 200 over a 90 degree edge (i.e., nearly a zero bend radius) and weights were hung from the fiber optic cables to apply a constant force. Delta attenuation (e.g., change in attenuation) at a reference wavelength of 1625 nanometers was measured while the cable 200 was subjected to the load. The results for the corner bend test are summarized in Table 4 below:

TABLE 4

Corner Bend Test

| Load | Delta Attenuation (dB) 2 fiber cable 200 (FIG. 8) with fixed fiber position or controlled fiber spacing | | |
|---|---|---|---|
| (kg) | 1310 nm | 1550 nm | 1625 nm |
| 0 | 0.00 | 0.00 | 0.00 |
| 2 | 0.00 | 0.00 | 0.01 |

TABLE 4-continued

Corner Bend Test

| Load | Delta Attenuation (dB) 2 fiber cable 200 (FIG. 8) with fixed fiber position or controlled fiber spacing | | |
|---|---|---|---|
| (kg) | 1310 nm | 1550 nm | 1625 nm |
| 6 | 0.00 | 0.01 | 0.02 |
| 10 | 0.00 | 0.01 | 0.02 |
| 14 | 0.00 | 0.01 | 0.02 |

The delta attenuation values shown in Table 4 for the cable 200 reflect an average delta attenuation for the two fibers 1 due to the applied loads. As tabulated in Table 4, the fiber optic cable 200 had low delta attenuation values under loads of up to 14 kilograms. By way of example, the fiber optic cable 200 had a delta attenuation of about 0.1 dB or less for the corner bend test under a load of 6 kilograms at a reference wavelength of 1625 nanometers. In another embodiment, the fiber optic cable 200 had a delta attenuation of about 0.08 dB or less for the corner bend test under a load of 6 kilograms at a reference wavelength of 1625 nanometers. In yet another embodiment, the fiber optic cable 200 had a delta attenuation of about 0.04 dB or less for the corner bend test under a load of 6 kilograms at a reference wavelength of 1625 nanometers.

Mandrel wrap testing was also performed on cable 200 by wrapping the cable about mandrels of varying diameters, as discussed above with reference to FIG. 3. The delta attenuation (dB) for the loss was measured after wrapping a predetermined number of turns (i.e., each turn is about 360 degrees) of fiber optic cable 200 around three mandrels of different diameter (7.5 mm, 10 mm, and 15 mm) Table 5 details the optical performance attenuation loss data for the cable 200 at a reference wavelength of 1625 nanometers:

TABLE 5

Delta Attenuation (dB) at 1625 nm - Mandrel Wrap

| Number of Turns | Delta Attenuation (dB) 2 fiber cable 200 (FIG. 8) with fixed fiber position or controlled fiber spacing | | |
|---|---|---|---|
| | 7.5 mm mandrel | 10 mm mandrel | 15 mm mandrel |
| 0 | 0.00 | 0.00 | 0.00 |
| 1 | 0.04 | 0.08 | 0.02 |
| 2 | 0.10 | 0.14 | 0.05 |
| 4 | 0.24 | 0.20 | 0.10 |

The delta attenuation values shown in Table 5 for the cable 200 reflect an average delta attenuation for the two fibers 1 due to the mandrel wrap test. As tabulated in Table 5, the fiber optic cable 200 had low delta attenuation values under various numbers of turns and mandrel diameters. By way of example, the fiber optic cable 200 had a delta attenuation of about 0.4 dB or less when wrapped 2 turns around a 7.5 mm diameter mandrel at a reference wavelength of 1625 nanometers. In another embodiment, the fiber optic cable 200 had a delta attenuation of about 0.2 dB or less when wrapped 2 turns around a 7.5 mm diameter mandrel at a reference wavelength of 1625 nanometers. In yet another embodiment, the fiber optic cable 200 had a delta attenuation of about 0.15 dB or less when wrapped 2 turns around a 7.5 mm diameter mandrel at a reference wavelength of 1625 nanometers.

Example

According to an exemplary embodiment, a fiber optic cable 200 as illustrated in FIG. 8 is a rugged, indoor/outdoor drop cable having a UV-resistant, fungus-resistant, riser rated PVC outer jacket 210*b*. The outer jacket 210*b* is made from PVC material available from Georgia Gulf Corporation under the product designation GEORGIA GULF 16882 COAX AND TELECOM FLEXIBLE PVC, and has a jacket elongation of at least 270%, more specifically in the range of 300-350%. The outer jacket 210*b* includes additives to increase its UV light resistance and fungus resistance. The maximum brittleness temperature of the outer jacket 210*b* is −35° C. The outer diameter of the jacket 210*b* is 4.8 mm and the outer diameter of the buffer layers 210*a* is 900 µm. The buffer layers 210*a* are surrounded by a plurality of aramid yarn strength members 214, which are generally disposed between the buffer layers 210*a*, and between the buffer layers 210*a* and the outer jacket 210*b*. The aramid strength members are arranged so that they generally surround the buffer layers 210*a*.

The protective covering 210 uses a bend radius control mechanism for protecting the optical fibers 1 by inhibiting damage and/or breaking of the optical fiber as the fiber optic cable 200 is bent into small bend radii while still providing a highly flexible fiber optic cable design. Robustness of the fiber optic cable design is accomplished by coupling with the protective covering 210 to inhibit buckling of the optical fibers 1. Maintaining coupling between the outer jacket 210*b* and the strength members 214 inhibits transfer of tensile forces to the optical fibers 1. As in the embodiments discussed above, coupling is accomplished using a pressure extrusion process that results in very little to no construction stretch for the strength members. Any suitable type of material may be used for protective covering 210, such as polyurethanes (PU), polyvinylchloride (PVC), polyethylenes (PE), polypropylenes (PP), UV-curable materials, etc. depending on the desired construction and characteristics. By way of example, the fiber optic cable 200 includes two optical fibers 1, each fiber having a plenum-grade buffer layer 210*a* with an outer diameter of about 900 µm microns. Thereafter, four strength members 214 are run in a parallel configuration (i.e., no stranding) about each buffered optical fiber. The outer jacket 210*b* is then applied over the buffered fibers. For both indoor and outdoor applications, the outer jacket 210*b* may be pressure extruded using a PVC material available from Georgia Gulf Corporation under the product designation GEORGIA GULF 16882 COAX AND TELECOM FLEXIBLE PVC. For a version of the cable 200 suitable for indoor use, GULF 16881 COAX AND TELECOM FLEXIBLE PVC can be used as the jacket 210*b* material.

Figure 9:
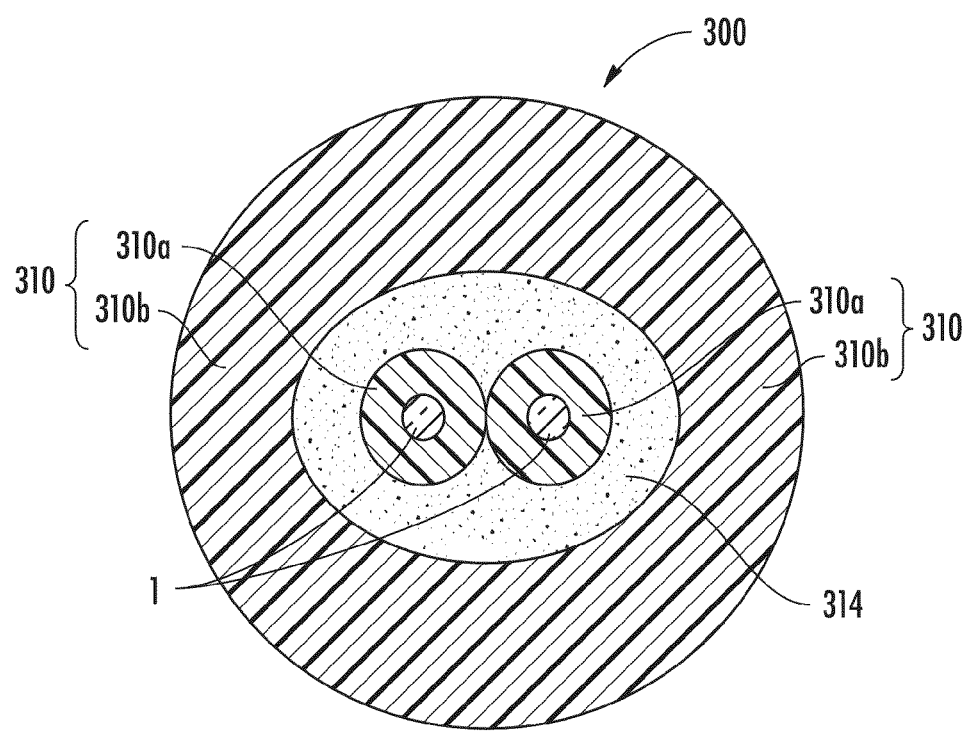
FIG. 9 is a cross-section of another fiber optic cable including the bend performance optical fiber of FIG. 1.

FIG. 9 depicts a cross-sectional view of a fiber optic cable 300 according to an embodiment of the present invention having two optical fibers 1. The optical fibers 1 are maintained within a protective covering 310 comprising spaced buffer layers 310*a* and an outer jacket 310*b*. The cable 300 may also include a plurality of optional strength members 314 disposed between the buffer layers 310*a* and the jacket 310*b*. The strength members 314 can include, for example, a water-swellable component for blocking the migration of water along the fiber optic cable 300. In one embodiment, the outer jacket 310*b* comprises a riser rated PVC material having a maximum brittleness temperature of −28° for cold impact performance, the strength members 314 are made from aramid fiber, and the buffer layers 310*a* are PVC tight buffer coatings.

Figure 10:
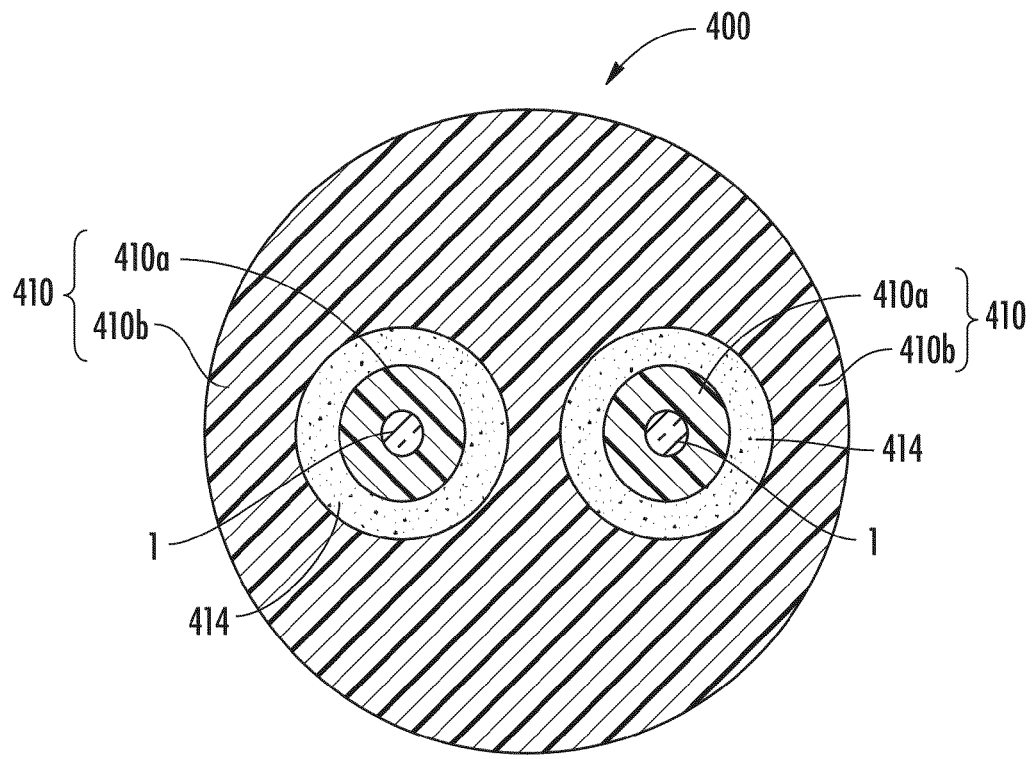
FIG. 10 is a cross-section of another fiber optic cable including the bend performance optical fiber of FIG. 1.

FIG. 10 depicts a cross-sectional view of a fiber optic cable 400 according to an embodiment of the present invention having two spaced optical fibers 1. Each optical fiber 1 is maintained within a protective covering 410 comprising a buffer layer 410*a* and an outer jacket 410*b*. The cable 400 may also include a plurality of optional strength members 414 disposed between the buffer layers 410*a* and the jacket 410*b*. The strength members 414 can include, for example, a water-swellable component for blocking the migration of water along the fiber optic cable 400. In one embodiment, the outer jacket 410*b* comprises a riser rated PVC material having a maximum brittleness temperature of −28° for cold impact performance, the strength members 414 are made from aramid fiber, and the buffer layers 410*a* are PVC tight buffer coatings.

Figure 11:
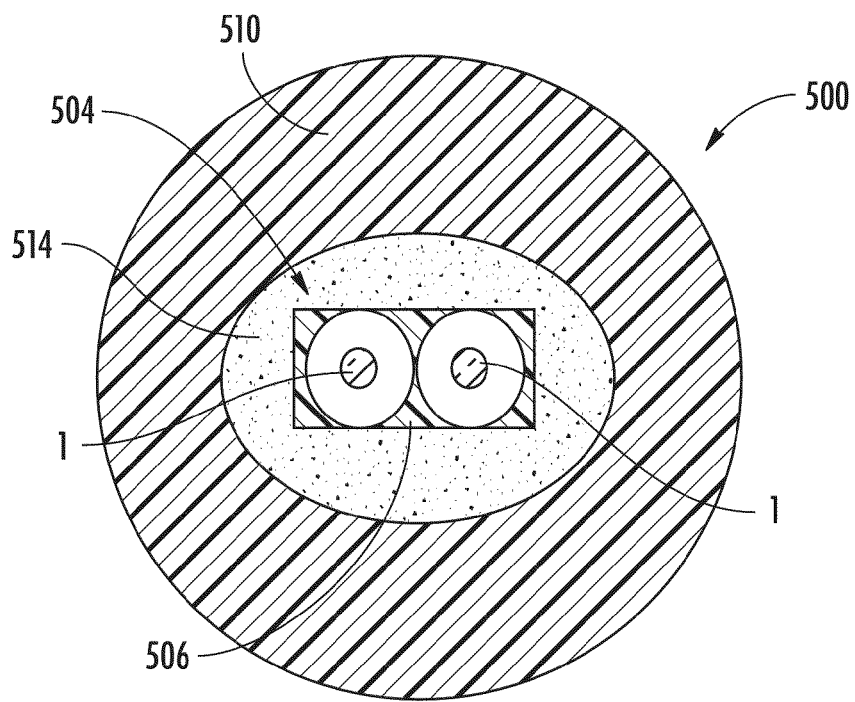
FIG. 11 is a cross-section of another fiber optic cable including the bend performance optical fiber of FIG. 1.

FIG. 11 depicts a cross-sectional view of a fiber optic cable 500 according to an embodiment of the present invention having two optical fibers 100 as part of a ribbon structure 504. The fibers 100 are enclosed or encased within a matrix 506 that forms an elongate structure around the fibers 100. The cable 500 may also include a plurality of optional strength members 514 disposed between the matrix 506 and an outer jacket 510. Strength members 514 can include, for example, a water-swellable component for blocking the migration of water along the fiber optic cable 500. In one embodiment, the outer jacket 510 comprises a riser rated PVC material having a maximum brittleness temperature of −28° for cold impact performance, and the strength members 514 are made from aramid fiber.

Although the values in Tables 1-5 illustrate individual attenuation data points, it is to be understood that the individual attenuation values may represent the upper value in a range of attenuation values for each test configuration, and that accordingly, a range of lower attenuation values that are less than the disclosed data points may be obtained for each test configuration.

What is claimed is:

1. A fiber optic cable, comprising:
a first optical fiber;
a first buffer layer on the first optical fiber;
a second optical fiber;
a second buffer layer on the second optical fiber; and
an outer jacket surrounding the first and second buffer layers, wherein
the fiber optic cable has an average delta attenuation of 0.4 dB or less when wrapped 2 turns about a 7.5 millimeter diameter mandrel at a reference wavelength of 1625 nanometers, and wherein the fiber optic cable has an average delta attenuation of 0.07 dB or less when wrapped 2 turns about a 15 millimeter diameter mandrel at a reference wavelength of 1625 nanometers.

2. The fiber optic cable of claim 1, wherein the first and second buffer layers comprise a PVC material.

3. The fiber optic cable of claim 2, wherein the outer jacket comprises a PVC material.

4. The fiber optic cable of claim 1, further comprising at least one strength member, the at least one strength member being in part disposed between the first and second buffer layers.

5. The fiber optic cable of claim 1, wherein aramid strength members are disposed between the first buffer layer and the outer jacket.

6. The fiber optic cable of claim 5, wherein the outer jacket is pressure extruded around the aramid strength members and is coupled to at least one strength member by partial embedment of at least one of the strength members in the outer jacket.

7. The fiber optic cable of claim 6, wherein the first buffer layer is spaced from the second buffer layer and the first buffer layer has at least one point of contact with the second buffer layer along a length of the cable.

8. A fiber optic cable, comprising:
   a first optical fiber;
   a first buffer layer on the first optical fiber;
   a second optical fiber;
   a second buffer layer on the second optical fiber; and
   an outer jacket surrounding the first and second buffer layers, wherein
   the fiber optic cable has an average delta attenuation of 0.4 dB or less when wrapped 2 turns about a 7.5 millimeter diameter mandrel at a reference wavelength of 1625 nanometers, and wherein the first and second buffer layers have an ultimate elongation of 500% or more measured according to DIN 53504.

9. The fiber optic cable of claim 8, wherein the outer jacket has an ultimate elongation of 500% or more measured according to DIN 53504.

10. A fiber optic cable, comprising:
    a first optical fiber;
    a first buffer layer on the first optical fiber;
    a second optical fiber;
    a second buffer layer on the second optical fiber; and
    an outer jacket surrounding the first and second buffer layers, wherein
    the fiber optic cable has an average delta attenuation of 0.4 dB or less when wrapped 2 turns about a 7.5 millimeter diameter mandrel at a reference wavelength of 1625 nanometers, and the fiber optic cable having an average delta attenuation of 0.1 dB or less for a corner bend test under a load of 2 kilograms and a reference wavelength of 1625 nanometers.

\* \* \* \* \*